United States Patent [19]

Steenwyk et al.

[11] Patent Number: 5,572,809
[45] Date of Patent: Nov. 12, 1996

[54] CONTROL FOR HYDRAULICALLY OPERATED CONSTRUCTION MACHINE HAVING MULTIPLE TANDEM ARTICULATED MEMBERS

[75] Inventors: Timothy E. Steenwyk; Eric J. Walstra, both of Grand Rapids, Mich.

[73] Assignee: Laser Alignment, Inc., Grand Rapids, Mich.

[21] Appl. No.: 414,991

[22] Filed: Mar. 30, 1995

[51] Int. Cl.$^6$ .................. G06G 7/64; G05D 1/04; E02F 3/43; E02F 9/20
[52] U.S. Cl. .................. 37/348; 364/424.07; 172/2; 172/4; 414/699; 37/907
[58] Field of Search .................. 37/348, 464, 906, 37/907; 364/424.07; 172/2, 4, 4.5, 7; 414/694, 695.5, 699, 786

[56] References Cited

U.S. PATENT DOCUMENTS

| | | |
|---|---|---|
| 3,283,230 | 11/1966 | Davies et al. .................. 37/348 X |
| 3,636,325 | 1/1972 | Chytil .................. 364/424.07 X |
| 3,708,232 | 1/1973 | Walsh . |
| 3,727,332 | 4/1973 | Zimmer . |
| 3,813,171 | 5/1974 | Teach et al. . |
| 3,887,012 | 6/1975 | Scholl et al. . |
| 3,997,071 | 12/1976 | Teach . |
| 4,034,490 | 7/1977 | Teach . |
| 4,050,171 | 9/1977 | Teach . |
| 4,129,224 | 12/1978 | Teach . |
| 4,162,708 | 7/1979 | Johnson . |
| 4,231,700 | 11/1980 | Studebaker . |
| 4,273,196 | 6/1981 | Etsusaki et al. . |
| 4,286,386 | 9/1981 | Long . |
| 4,288,196 | 9/1981 | Sutton, II . |
| 4,377,043 | 3/1983 | Inui et al. . |
| 4,413,684 | 11/1983 | Duncklee . |
| 4,452,078 | 6/1984 | Formanek et al. . |
| 4,491,927 | 1/1985 | Bachmann et al. . |
| 4,514,796 | 4/1985 | Saulters et al. . |
| 4,535,699 | 8/1985 | Bühler . |
| 4,600,997 | 7/1986 | Cain et al. . |
| 4,633,383 | 12/1986 | Omachi et al. . |

(List continued on next page.)

FOREIGN PATENT DOCUMENTS

| | | | |
|---|---|---|---|
| 45025 | of 1986 | Japan .................. | E02F 3/36 |
| 2101077 | 1/1983 | United Kingdom . | |

OTHER PUBLICATIONS

Product bulletin entitled "Automatic Excavation Depth Measuring Device", published in the United States by Komatsu, publication date unknown.

Product brochure entitled "Laser–Level–System For Controlling Excavation Depth," published in the United States by Moba Electronics, publication date unknown.

Product brochure entitled "Hitachi Computing Monitor HCM–1," published in the United States by Hitachi, publication date unknown.

Product brochure entitled "Off to New Frontiers of Performance," published in the United States by O&K, publication date unknown.

*Primary Examiner*—Randolph A. Reese
*Assistant Examiner*—Thomas A. Beach
*Attorney, Agent, or Firm*—Van Dyke, Gardner, Linn & Burkhart, LLP

[57] ABSTRACT

An apparatus and method for controlling a hydraulically operated construction machine, having a plurality of tandem articulated members which are controlled in a manner that movement of one of the members is controlled in response to movement of another of the members, in order to move the members in a predetermined pattern. The members are controlled in response to the anticipated future movement of the another member. Anticipated future movement of the another member may be determined, for example, as a function of the present position and velocity of the another member and system delay in movement of the another member. Where the another member is controlled manually by an operator control lever coupled with a manual hydraulic control valve, anticipated future movement may be determined by monitoring actuation of the control lever.

37 Claims, 11 Drawing Sheets

U.S. PATENT DOCUMENTS

| | | | |
|---|---|---|---|
| 4,693,598 | 9/1987 | Sehr | 356/4 |
| 4,698,570 | 10/1987 | Satoh. | |
| 4,722,044 | 1/1988 | Heiser et al. . | |
| 4,726,682 | 2/1988 | Harms et al. | 356/375 |
| 4,758,970 | 7/1988 | Keary et al. | 364/559 |
| 4,771,389 | 9/1988 | Takahashi et al. . | |
| 4,805,086 | 2/1989 | Nielsen et al. | 364/167.01 |
| 4,829,418 | 5/1989 | Nielsen et al. | 364/167.01 |
| 4,866,641 | 9/1989 | Nielsen et al. | 364/559 |
| 4,884,939 | 12/1989 | Nielsen | 414/698 |
| 4,888,890 | 12/1989 | Studebaker et al. . | |
| 4,910,673 | 3/1990 | Narisawa et al. | 37/348 |
| 5,065,326 | 11/1991 | Sahm | 364/424.07 |
| 5,088,020 | 2/1992 | Nishida et al. | 364/424.07 X |
| 5,257,177 | 10/1993 | Bach et al. | 364/424.07 X |
| 5,356,259 | 10/1994 | Hanamoto et al. | 37/348 X |
| 5,438,771 | 9/1995 | Sahm et al. | 172/7 X |
| 5,442,868 | 8/1995 | Ahn | 364/424.07 X |
| 5,446,980 | 9/1995 | Rocke | 364/424.07 X |

CONTROL FOR HYDRAULICALLY OPERATED CONSTRUCTION MACHINE HAVING MULTIPLE TANDEM ARTICULATED MEMBERS

BACKGROUND OF THE INVENTION

This invention relates generally to hydraulically operated machines and, in particular, to such machines having multiple tandem articulated members which move in unison in order to produce a desired movement of one of the members. The invention is particularly adapted for use with hydraulically controlled construction equipment, such as hydraulic excavators.

Hydraulically controlled excavators typically include a body, or cab, which is pivotally mounted to a truck or track unit, to rotate about a vertical pivot, a boom pivotally mounted to the cab, a stick, or arm, pivotally mounted at the distal end of the boom, and a bucket pivotally mounted to the distal end of the arm. Hydraulic cylinders attached between the cab and the boom control pivotal movement of the boom. Hydraulic cylinders between the boom and arm control pivotal movement of the arm and hydraulic cylinders between the arm and bucket control pivotal movement of the bucket. In manually controlled excavators, an operator has separate control mechanisms, such as joysticks or levers, for operating all aforementioned cylinders in order to attempt to move a cutting edge of the bucket in a desired fashion. The difficulty with such manual mechanisms is that it is difficult for the operator to move the bucket cutting edge along a level plane, especially when excavating below ground, in order to, for example, prepare the site for footings or sewer pipe. In order to overcome such difficulty, it is known to assist the operator by providing an automatic control system which causes the excavator to move the cutting edge of the bucket along a fixed plane. One such control is disclosed in U.S. Pat. No. 4,829,418 issued May 9, 1989, to Edward G. Nielsen and Timothy E. Steenwyk for an APPARATUS AND METHOD FOR CONTROLLING A HYDRAULIC EXCAVATOR, which is commonly assigned with the present application. The control in the Nielsen et al. patent utilizes a rotating laser beacon set up at the construction site at the desired grade the excavator is to excavate to. A laser sensor is mounted to one of the moveable members, such as the stick, so as to pass through the laser beam during excavation. With a desired depth relative to the height of the laser plane entered into a control panel by the operator, the control system causes the cutting edge of the bucket to maintain the desired depth with respect to the rotating laser plane. Such control system allows the operator to maintain control over movement of the stick and/or bucket with the control system controlling movement of the boom. The boom is controlled in a manner which maintains the cutting edge of the bucket at the desired depth notwithstanding the motion of the bucket and stick.

One difficulty in automatically controlling the movement of the boom of the excavator in response to the movement of the stick by the operator is that delays accompanying the response of the hydraulic system to commands made upon the system make it difficult for the control system in a manner which accurately maintains the cutting edge of the bucket at the desired depth under all conditions.

SUMMARY OF THE INVENTION

The present invention is directed to a method and apparatus for controlling a hydraulically operated construction machine, such as a hydraulic excavator, having multiple tandem articulated members in a manner which takes into account the characteristics of the hydraulic system controlling the members, as well as the dynamic movement of the members, in order to control the height of the cutting edge to a desired depth under all operating conditions of the machine. According to the invention, the anticipated future movement of at least one of the members is determined. The anticipated future movement of the members is utilized to control movement of the members.

According to a more detailed aspect of the invention, a hydraulic excavator is controlled by receiving a user input selection of a desired cutting depth. Movement of the bucket, arm, and boom are monitored. An anticipated boom target position for the boom is determined. The anticipated boom target position is determined as a function of the selected desired cutting depth, slope and the position, velocity, and system delays of each of the bucket and arm. The boom is controlled to move in a direction toward the anticipated boom target position.

The boom is preferably controlled by comparing the position of the boom to the anticipated boom target position to determine a boom error. The boom is moved as a function of the value of the error, the rate of change of the error and the integral of the error.

According to another aspect of the invention, the operator control lever for the arm is monitored in order to determine that the operator has commanded the arm to move. The anticipated boom target position is adjusted in response to such actuation, in order to overcome hydraulic delay so that the boom and arm operate in unison.

The invention provides an exceptionally responsive control for a hydraulically operated construction machine that allows effortless control of the machine in the hands of the operator while providing excavation to a desired depth and grade without significant overshoot or undershoot. This allows the machine to accommodate various excavating techniques employed by different operators without any appreciable affect on the performance of the machine.

These and other objects, advantages, and features of this invention will become apparent upon review of the following specification in conjunction with the drawings.

DESCRIPTION OF THE PREFERRED EMBODIMENT

Figure 1:
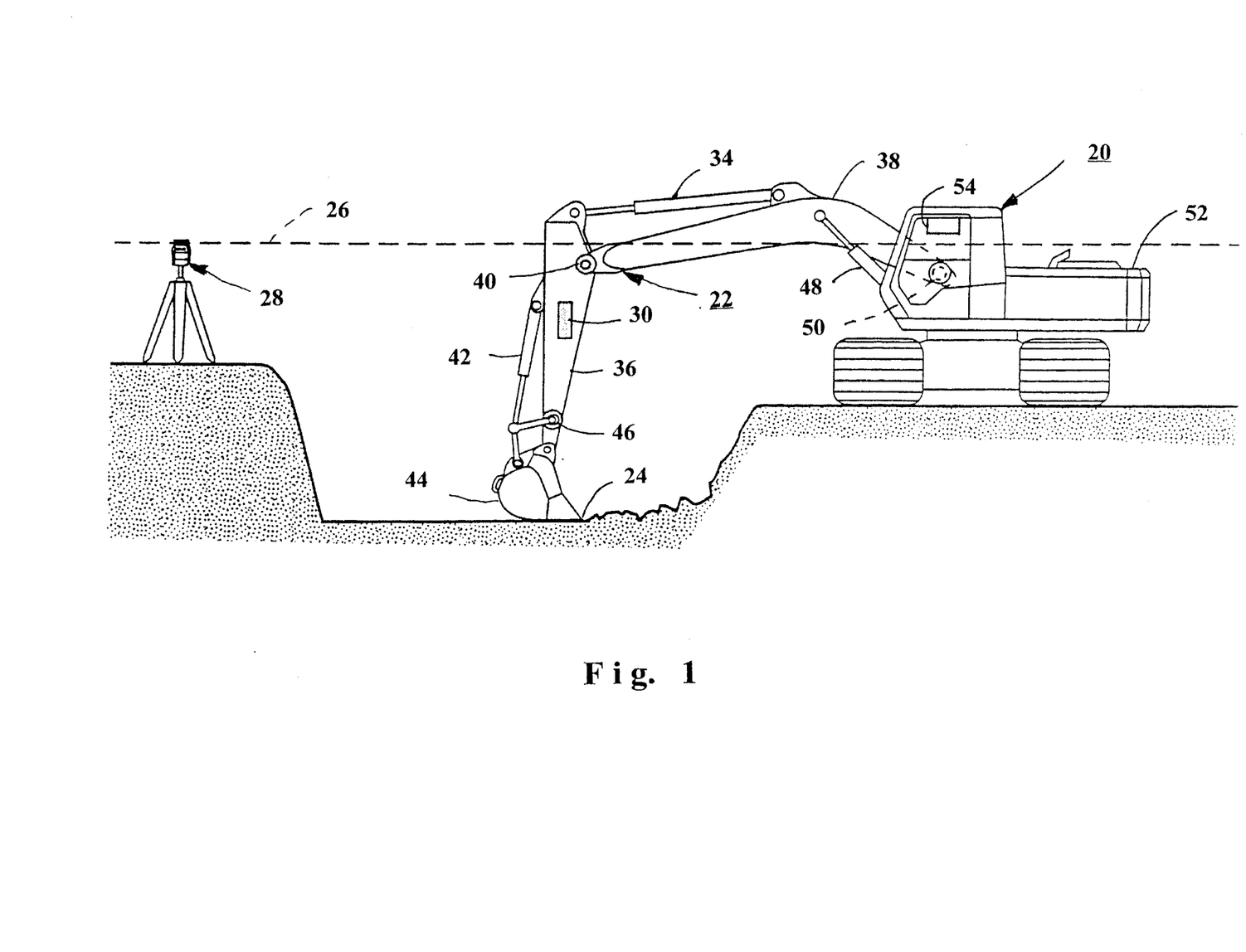
FIG. 1 is a side elevation of a hydraulic excavator controlled according to the invention.

Referring now specifically to the drawings and the illustrative embodiments depicted therein, a hydraulically operated construction machine, such as an excavator 20, includes a plurality of tandem articulated members, generally shown in 22, which operate in unison in order to move a portion of one of the members, such as a cutting edge 24, along a plane that bears a relationship to a plane of light 26 generated by a laser beacon 28. Excavator 20 can be excavated to either a horizontal plane or a plane on a slope even though plane of light and horizontal position 26 is horizontal. Such excavator is disclosed in detail in U.S. Pat. No. 4,829,418 issued May 9, 1989, to Edward G. Nielsen and Timothy E. Steenwyk for an APPARATUS AND METHOD FOR CONTROLLING A HYDRAULIC EXCAVATOR, the disclosure of which is hereby incorporated herein by reference. The detailed operation of excavator 20 is disclosed in Nielsen et al. and will not be repeated herein. Suffice it to say, a laser sensor, or receiver 30 mounted to one of the members 22, passes through laser plane 26 occasionally as the operator controls movement of the excavator. Every time the laser sensor passes through laser plane 26, the control system is calibrated in order to establish a true vertical height and horizontal position of cutting edge 24. A control system receives a user selection of a target depth and target slope and controls the movement of one or more of tandem articulated members 22 in order to maintain cutting edge 24 at a desired depth irrespective of movement of the manually controlled members. In particular, the operator controls a manual hydraulic valve (not shown), which regulates the flow of hydraulic fluid to a hydraulic cylinder 34, which controls the position of stick, or arm, 36 with respect to a boom 38. An encoder 40 monitors the relative angular position of arm 36 with respect to boom 38. The operator additionally has a manual control valve (not shown), which operates a cylinder 42, which pivots a bucket 44, with respect to arm 36. A bucket encoder 46 monitors the relative angular position of the bucket with respect to arm 36. The movement of a boom 38 is controlled by a hydraulic cylinder 48, which is under the control of the control system. A boom encoder 50 monitors relative angular position of the boom with respect to cab 52. Encoders 40, 46, and 50 may be rotary encoders operatively connected with the respective members, or may be linear encoders which respond to the extended length of the hydraulic cylinder (34, 42, 48) controlling the respective member, as disclosed in Nielsen et al. '418. In the illustrated embodiment, encoders 40, 46, and 50 are commercially available optical rotary encoders, which are marketed by Hecon Corporation of Germany under Model No. RI41-0/3600 AR.11KB.

In operation, the operator moves the joystick coupled with the manual control valves for cylinders 34 and 42 in order to reposition arm 36 and/or bucket 44. The typical movement is to drag the bucket in a plane in a direction toward the cab 52 in order to excavate with cutting edge 24. The control system responds to its various inputs, including the inputs from encoders 40, 46, and 50, in order to control the flow of hydraulic fluid to cylinder 48 and thereby control movement of boom 38. The control system moves the boom in a manner which maintains the vertical depth of cutting edge 24 at the target depth and on the target slope entered by the operator. Thus, it is seen that arm 36 and bucket 44 are manually controlled members which are moved in response to the operator's joystick and boom 38 is an automatically controlled member whose movement is in response to manual movement of the arm and bucket. It is, of course, possible that boom 38 and bucket 44 be the manually controlled members with arm 36 being automatically controlled. However, such arrangement would be less intuitive to the operator and is, therefore, not preferred.

Figure 2:
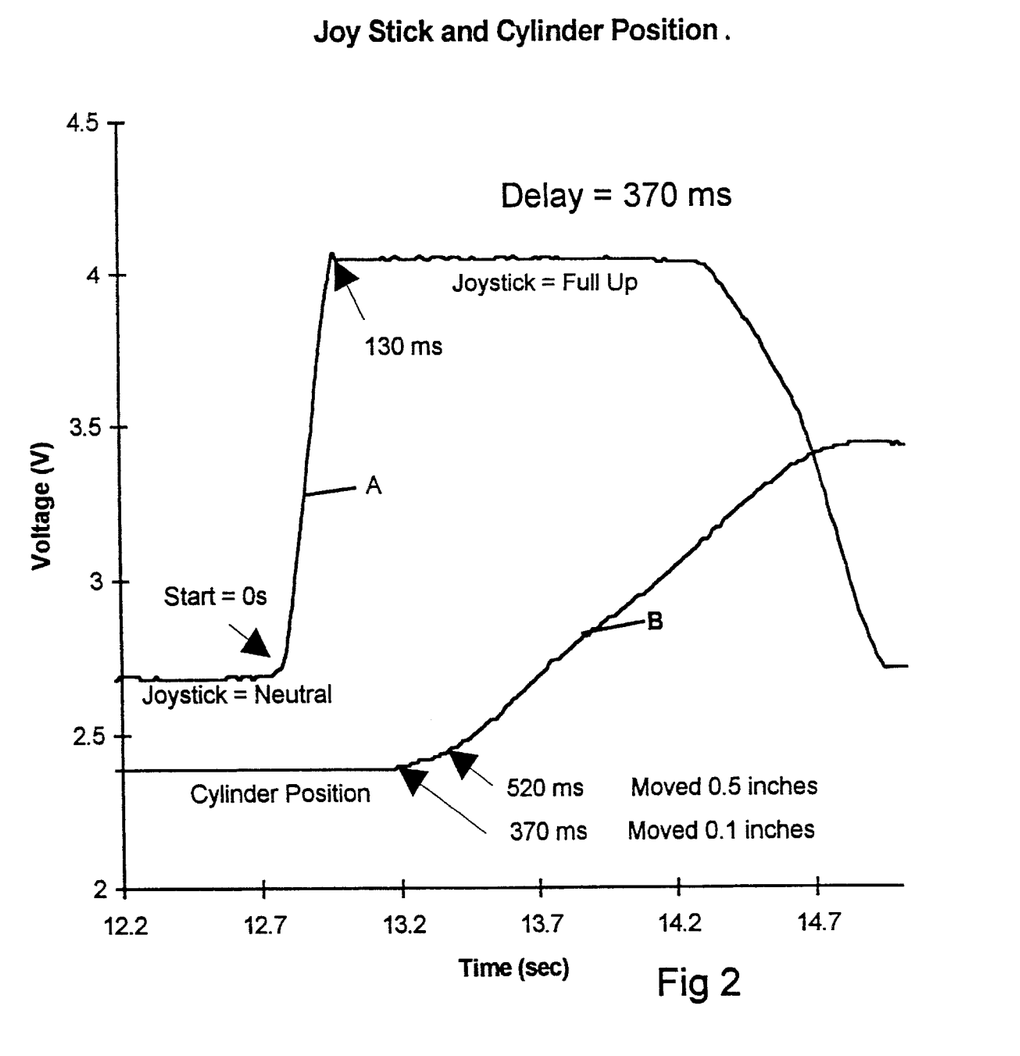
FIG. 2 is a graph illustrating the response of a hydraulically controlled member to movement of the control lever for the member.

One difficulty with such an excavator control is illustrated by reference to FIG. 2. The signal represented by curve A illustrates the hydraulic pressure supplied to one of members 22, such as arm 36, in response to the operator's movement of the manual control lever, or joystick (not shown), for the arm. It is seen from curve A that movement of the lever causes a rapid increase in the hydraulic pressure supplied to the controlled cylinder (34, 42, 48). Curve B represents the movement of the associated member in response to the input command represented by curve A. A comparison of the signals indicates that there is a delay of a fraction of a second, such as, by way of example, 350 milliseconds, between the operator commanding movement of the member and the actual movement of the member. If the control were to respond to the output of the encoder (40, 46, 50) alone, which would change in proportion to the movement of the associated member as illustrated in curve B, the control signals provided to the cylinder (34, 42, 48) of the controlled member by the control system could lag behind those signals provided to the cylinder (34, 42, 48) of the manually operated member by a significant fraction of a second, or greater. Such delay could create an erratic movement of cutting edge 24. Furthermore, once members 22 are set into motion, the inertia of the members, as well as such delays in the operation of the hydraulic control system, could create instability in the movement of cutting edge 24 as the control system attempts to maintain cutting edge 24 at the desired depth.

Figure 3:
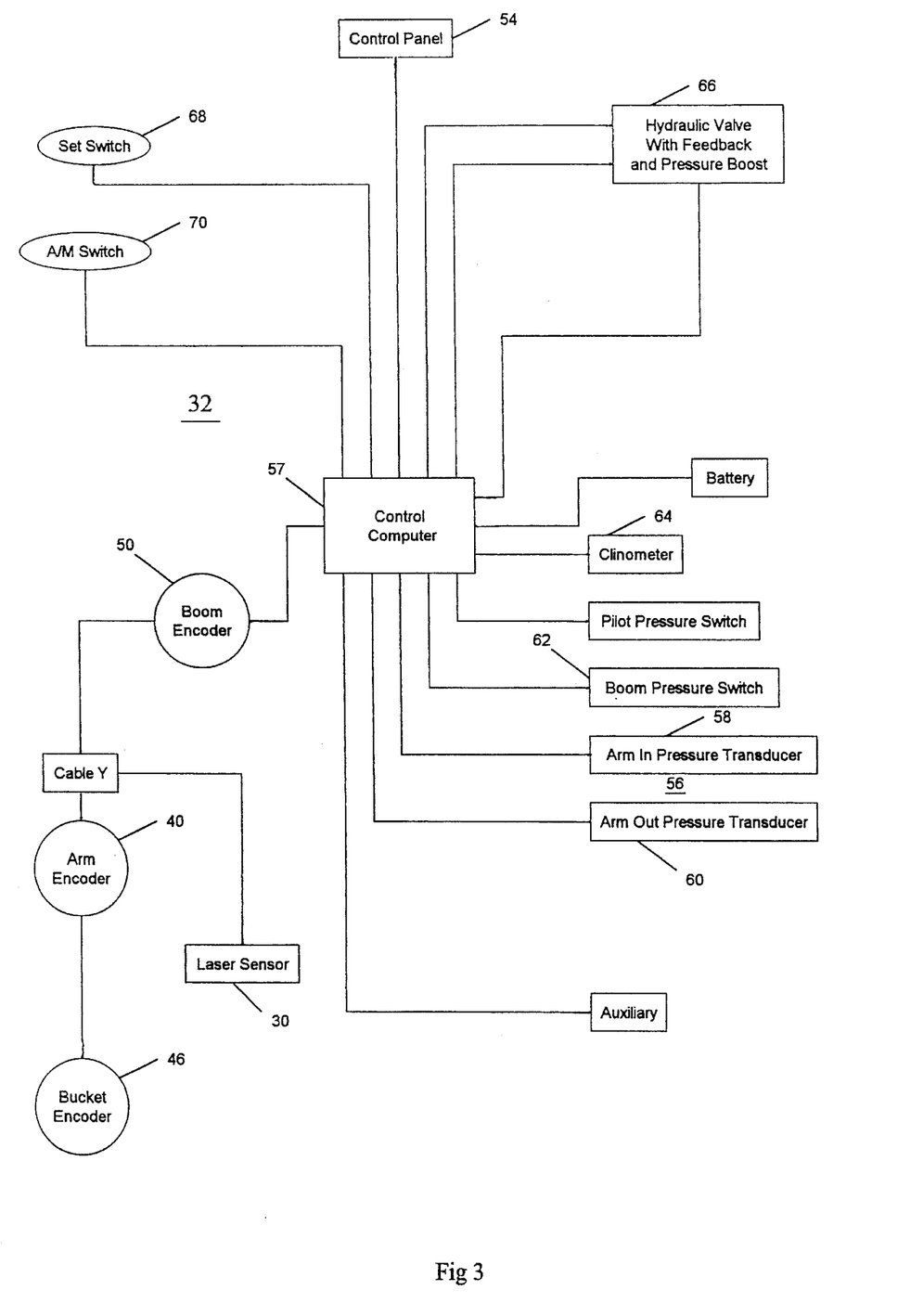
FIG. 3 is a block diagram of a control system, according to the invention.

In order to overcome such difficulties, an innovative control system 32 is provided which includes a control panel 54 for receiving user input selection of desired depth, and other related parameters, as well as providing visual feedback to the operator of various information (FIG. 3). Control system 32 additionally includes a monitor, generally illustrated at 56, in order to monitor the operator movement of the control valve (not shown) for the stick 36. Monitor 56 includes a pressure transducer 58, which monitors pilot pressure indicative of movement of the control lever which would move the arm inwardly, and a pressure transducer 60, which monitors the pilot pressure in order to determine that the operator has moved the control lever in a manner which would move the arm outwardly. Pressure transducers 58 and 60 are analog devices, which produce an output indicative of the magnitude at which the control lever has been operated and thereby indicate the extent of movement expected in the arm. However, it would also be possible to use transducers which only provide a binary indication that a lever has been moved and in which direction it has been moved. Although monitor 56 is illustrated as a pair of pressure transducers, it would also be possible to mount an electrical potentiometer, or similar such encoding device, directly to the lever, or joystick, manipulated by the operator in order to determine the movement of the lever by the operator. Control system 32 additionally includes a boom pressure switch 62, which produces an output when the operator moves the lever (not shown) which applies pilot pressure to move the boom.

A boom pressure switch 62 is provided in order to monitor operator manipulation of the lever (not shown) which manually actuates boom cylinder 48. The purpose of monitoring the boom operator lever is to cause the control system 32 to remove automatic control over the boom when the operator is attempting to move the boom manually to a significant extent. This avoids a "struggle" between the automatic and manual systems attempting to control movement of the boom. In the preferred embodiment, a clinometer 64 is mounted to cab 52 in order to provide necessary accuracy of control system 32, as further disclosed in Nielsen et al. '418.

Figure 11:
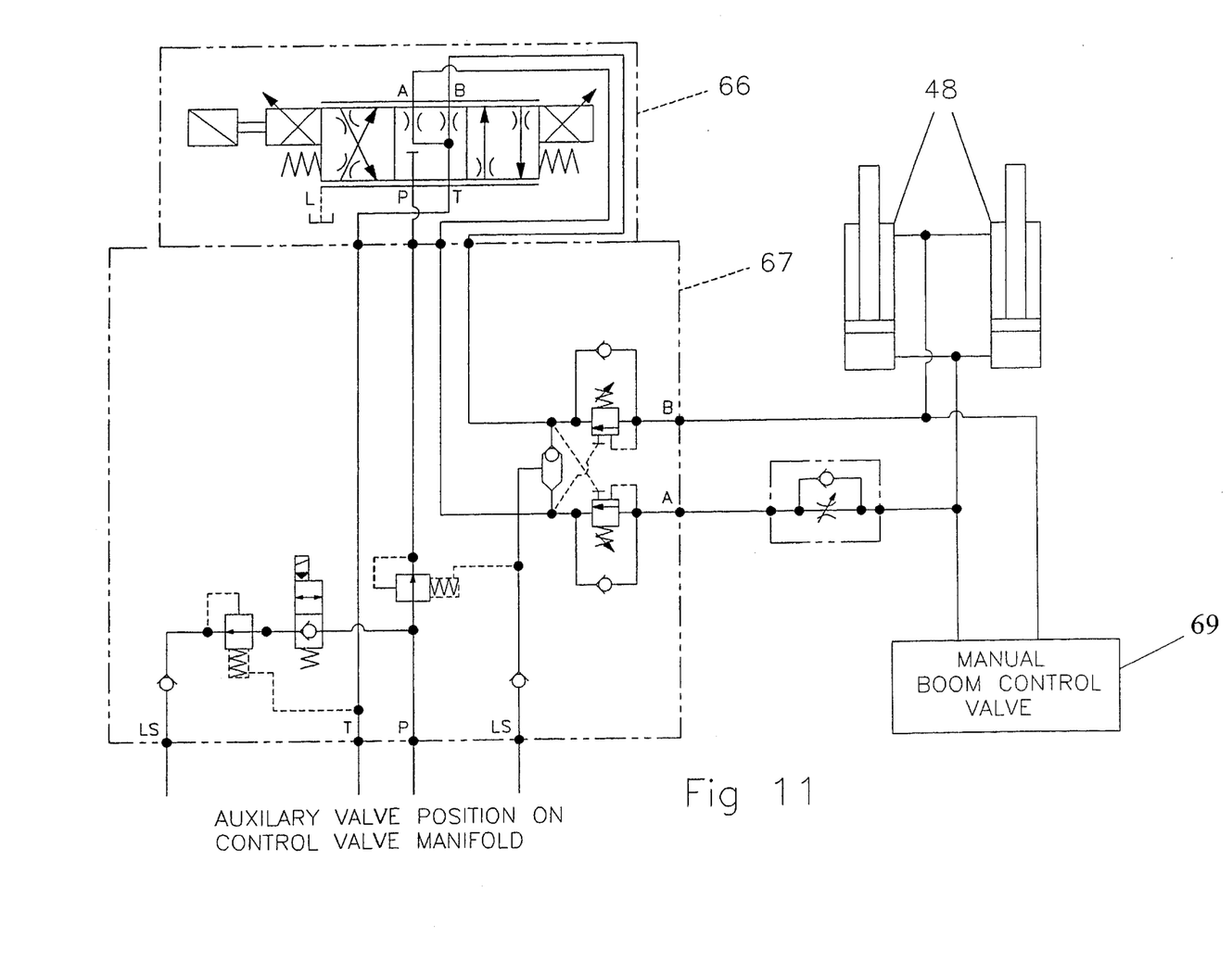
FIG. 11 is a hydraulic schematic diagram illustrating interconnection of the control valve used with the invention.

Control system 32 additionally includes a hydraulic valve 66 in order to provide automatic control over the movement of cylinder 48. As is conventional, excavator 20 includes a primary hydraulic control system, which operates in the range of approximately 5,000 psi in order to effect movement of cylinders 32, 42, and 48, along with a pilot system, which operates at a lower pressure, such as 500 psi, in order to receive user manual inputs from control levers which are used to move the control members in the primary system. The present invention utilizes a solenoid-operated hydraulic valve 66, which is connected through a manifold 67 in a parallel bypass configuration with the manually operated valve 69 of the primary hydraulic system of the excavator, as illustrated in FIG. 11. It has been discovered that, by supplying control at the primary hydraulic control system level, the automatic control system 32 eliminates certain delays that may be introduced by controlling the pilot system. Although it would be possible to compensate for such delays, according to the principles of the present invention, it was discovered that better control could be effected by eliminating such delays. In the illustrated embodiment, hydraulic valve 66 is commercially available marketed by Bosch gMbH of Germany under Model No. 0811-404-080.

In the illustrated embodiment, automatic control system 32 is responsive either to a laser plane 26 generated by a laser beacon 28, as described in Nielsen et at. '418 or to a manually calibrated control system including a set switch 68. In order to calibrate control system 32 utilizing switch 68, the operator places the cutting edge 24 at the desired digging depth and then actuates switch 68. The excavator will excavate to a level or a sloped plane at the calibrated depth of the cutting edge. Alternatively, for laying a sewer pipe, or the like, the operator could place cutting edge 24 on the top of a previously laid section pipe, actuate switch 68, and enter an offset, such as 12 inches or the like, in control panel 24. The excavator will excavate to a plane that is offset from the position of the cutting edge at calibration by the entered amount. An automatic/manual switch 70 allows the operator to switch between automatic and manual operation of the excavator 20. It should be apparent that the principles of the present invention may be utilized with any technique utilized to calibrate the control system of the excavator and monitor movement of its members.

Figure 4:
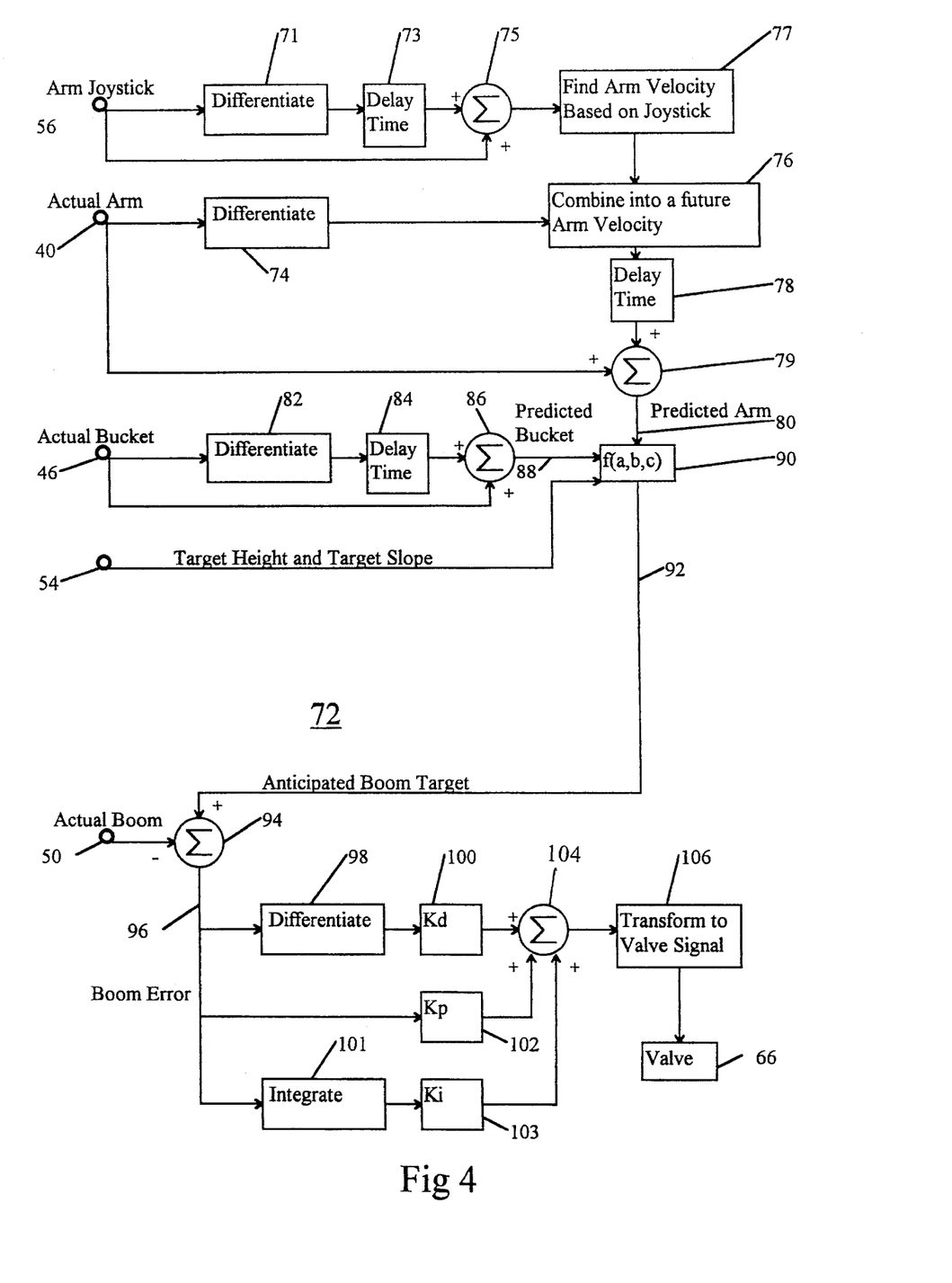
FIG. 4 is a control block diagram illustrating the control theory utilized in the invention.

In order to control the position of cutting edge 24 in a manner that anticipates movement of the tandem articulated members 22, a control algorithm 72 is utilized (FIG. 4). The control algorithm monitors the position and direction of actuation of the operator's arm joystick, as represented by monitor 56, the relative actual position of the arm, as represented by encoder 40, the relative actual position of the bucket, as represented by encoder 46, and a target height and slope as entered in control panel 54. The control algorithm additionally uses information of the relative actual boom position as represented by encoder 50. The control algorithm determines at 71 the velocity of arm movement being requested by movement of the operator's arm joystick by differentiating the output of monitor 56 and multiplies (73) the velocity by a constant time unit to convert velocity to position units. The resulting value is summed with the actual joystick position at 75 to arrive at an arm velocity 77 based upon joystick actuation. Control algorithm 72 determines at 74 the velocity of the movement of arm 36 differentiating the output of encoder 40. The value is then combined at 76 with arm velocity 77 and multiplied by a time value 78 representative of system delays in the movement of the arm, in order to produce an output in units of position. The position value produced thereby is summed at 79 with the actual arm position in order to produce a predicted arm position 80.

In a like manner, the velocity of movement of the bucket is determined at 82 by differentiating the output of encoder 46 and multiplied at 84 by a time value that is representative of system delay in movement of the bucket, in order to derive a position value, which is summed at 86 with the actual bucket position. The result is a predicted bucket position parameter 88. The time delay values used at 78 and 84 are a function of the delays in movement of the respective members which result from hydraulic delay and other delay factors.

The computed predicted arm angle 80, the computed predicted bucket angle at 88, and the target height and grade parameters entered from control panel 54 by the operator are combined at 90, according to a functional relationship f(a, b, c). Functional relationship f(a, b, c) determines a boom angle that would put cutting edge 24 at the desired height and slope as a function of the lengths of members 22 and the anticipated arm and bucket angles (80, 88). By way of illustration, if cutting edge 24 is on grade, $$F(x)=0=H_a+H_b+H_c-H_{desired} \quad (1)$$

where $H_a$, $H_b$, and $H_c$ are the contributions to the cutting edge height of each member 22 and $H_{desired}$ is determined from the target height and slope entered on operator panel 54.

Equation (1) is equivalent to:

$$F(x)=0=f_1(L_A, L_B, L_C, \Theta_B, \Theta_C) \cos(\text{Boom Angle})+ \quad (2)$$

$$f_2(L_A, L_B, L_C, \Theta_B, \Theta_C) \sin(\text{Boom Angle})-H_{desired}$$

where $f_1(L_A, L_B, L_C, \Theta_B, \Theta_C)$ and $f_2(L_A, L_B, L_C, \Theta_B, \Theta_C)$ are functions determined from the lengths and angles of the arm and bucket. "Boom Angle" is an anticipated boom target angle output at 92.

Equation (2) can be solved by several iterative methods. In a preferred embodiment, equation (2) is solved using Newton's method of successive approximations.

Anticipated boom target 92 represents an anticipated boom target angle that takes into account anticipated positions of the arm and bucket as well as the desired target height and slope of the cutting edge 24. If the velocity of the arm and bucket are relatively small, the anticipated target boom value at 92 will be close to the value dictated by the arm and bucket actual positions, as well as the desired height entered by the operator. If, however, the members are moving at a relatively high velocity, the value of the anticipated target boom at 92 will be adjusted in order to allow control system 32 to move cutting edge 24 at the desired height without overshoot or undershoot. The anticipated boom target value may be either below or above the actual boom target and is typically constantly changing. Therefore, the anticipated boom target may have changed before it is reached by the boom.

Figure 9:
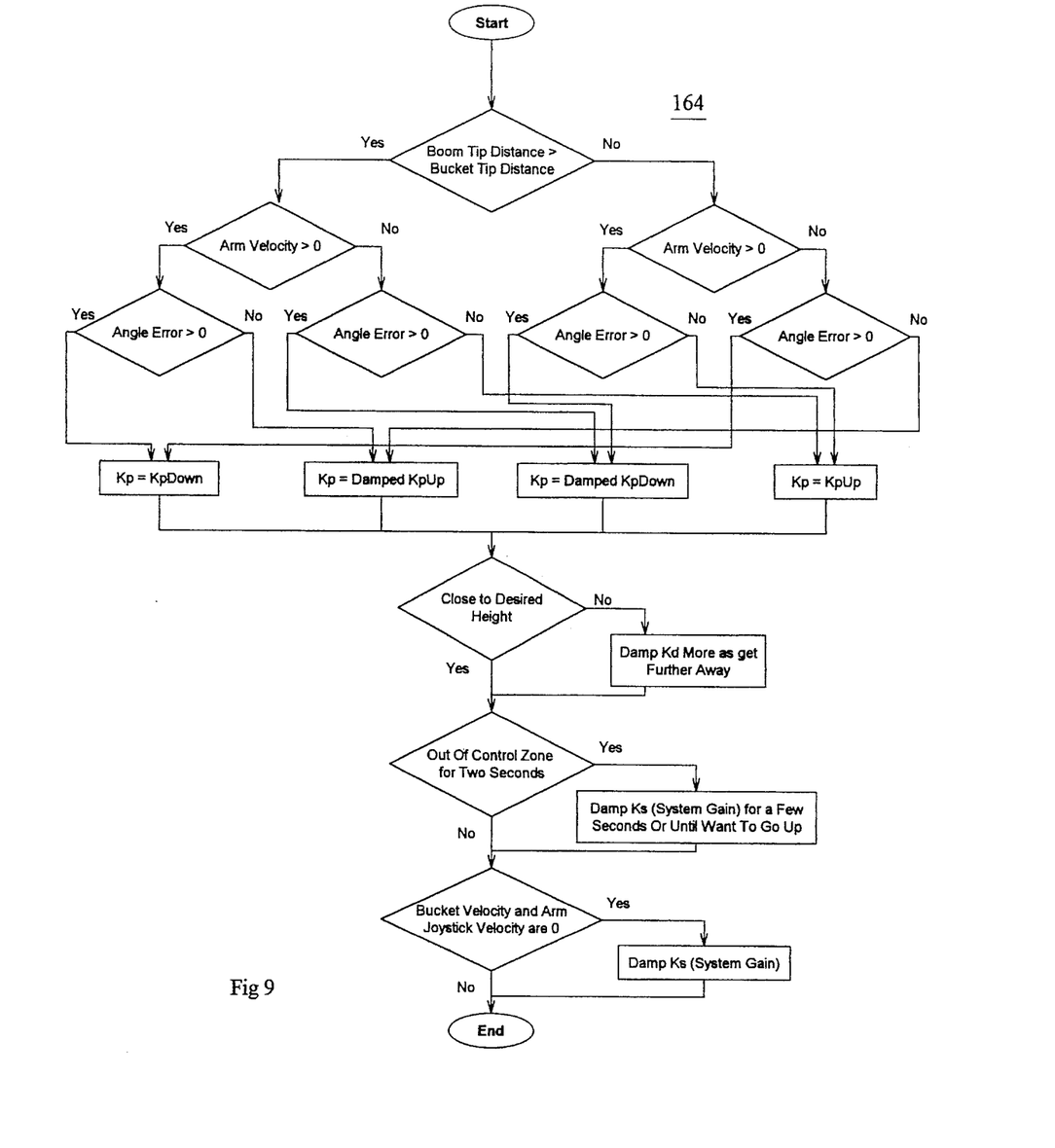
FIG. 9 is a flowchart of the "find the constants for the PID controller" subfunction.
Figure 10:
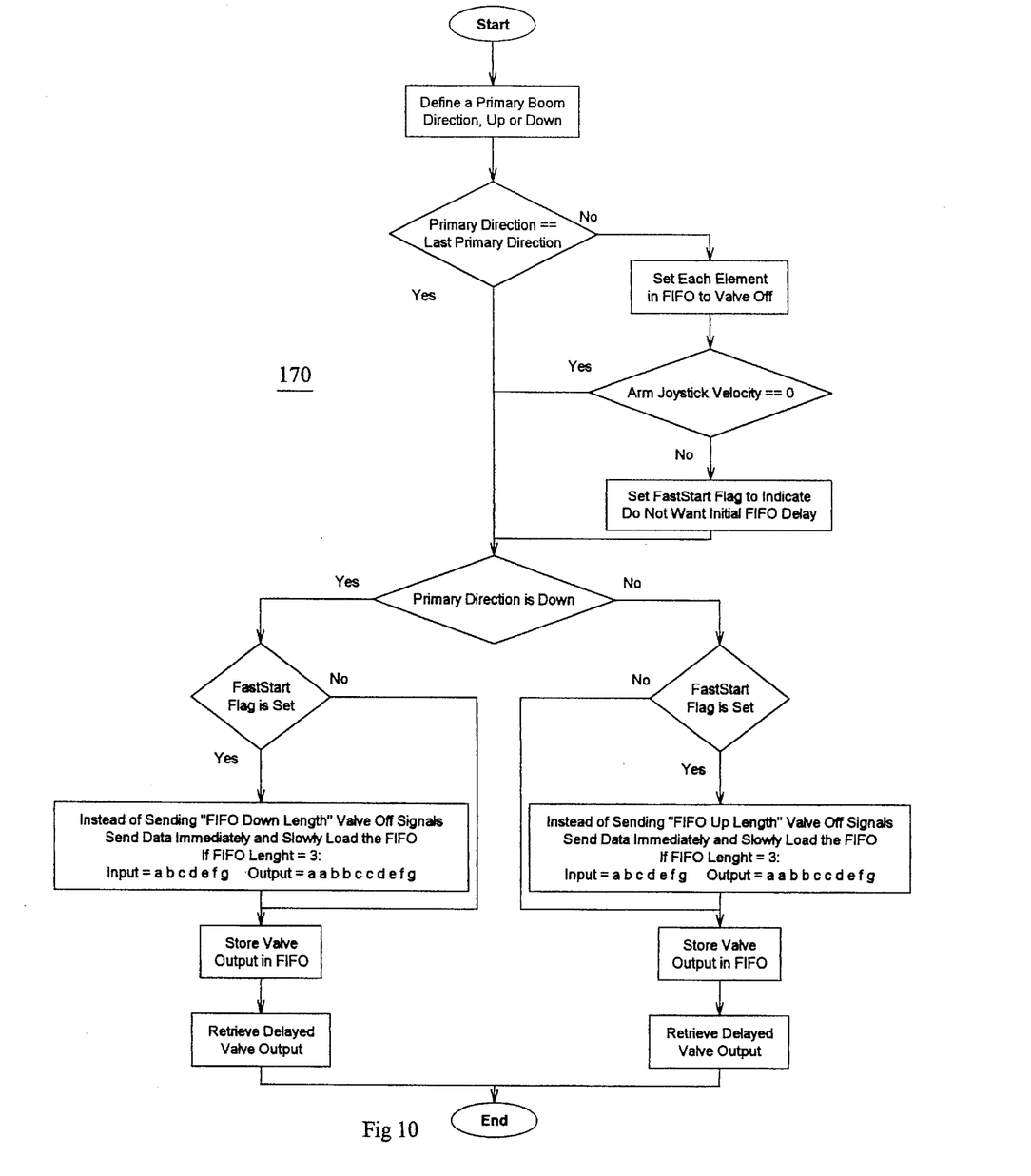
FIG. 10 is a flowchart of the "variable valve output delay" subfunction.

Algorithm 72 takes the difference at 94 between the target boom parameter at 92 and the actual boom input (50) in order to produce a boom error parameter at 96. The velocity of the boom error is determined at 98 by differentiating the value. The velocity value is multiplied by a constant $K_d$ at 100 and summed at 104 with the boom error multiplied by a constant $K_p$ (102), and the integral of the boom error taken at 101 and multiplied by a constant $K_i$ at 103. These values are summed at 104 in order to determine an output signal 106. Output signal 106 is a command to move the boom and is applied to operate valve 66. Constants $K_d$, $K_p$, and $K_i$ are selected in a subfunction 164 (FIG. 9) and pertain to the relative positions and velocities of members 22 as well as to the particular physical embodiment of excavator 20.

The control algorithm 72 is carried out in a control routine 108 (FIGS. 5–10). After the routine is initialized at 110, the control determines the geometry at 112 of excavator 20 in the manner illustrated in more detail in FIG. 6. This includes finding the length of the boom, arm, and bucket as well as various other parameters previously entered. The control then determines at 114 if laser sensor 30 has been struck by laser plane 26, provided that the control is in the laser mode. If so, then the control finds the geometry of the laser strike at 116 and calculates the laser height above the rotation point at 118 in the manner described in more detail in Nielsen et al. '418. Thereafter, the control calculates a desired digging depth at 120 in the manner described in more detail in Nielsen et al. '418.

Figure 7:
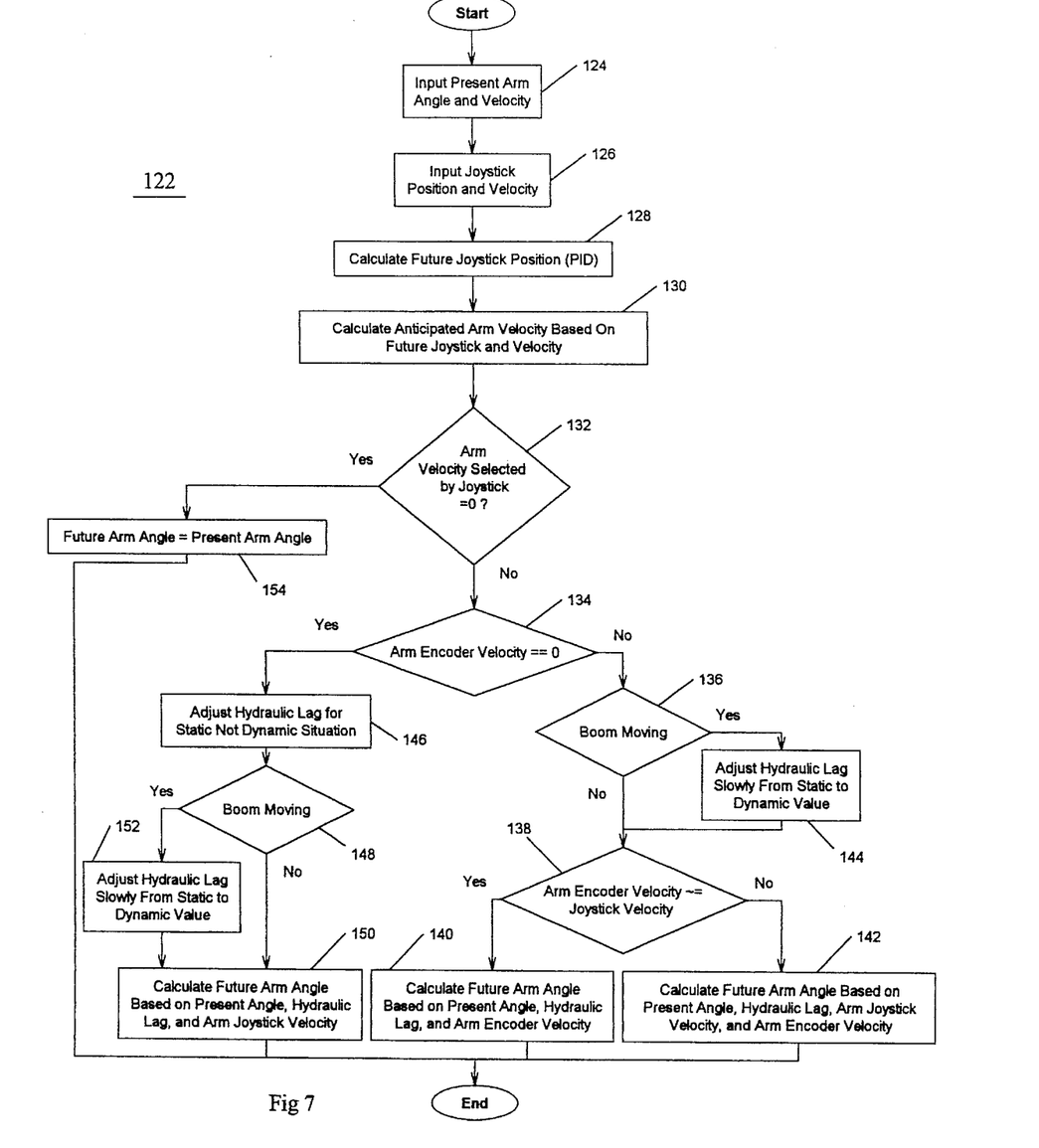
FIG. 7 is a flowchart of the "find future arm angle" subfunction.

A "find future arm angle" routine 122 is then carried out (FIG. 7). In order to find the future arm angle, the control determines the anticipated velocity of movement of the arm based upon the position and velocity of movement of the operator's control lever, or joystick, by examining monitor 56 (124, 126, 128, 130). If it is determined at 132 that the anticipated velocity of the arm represented by the position of the operator's joystick is not zero, then the subfunction responds in a manner that assumes the arm velocity is presently already occurring. The subfunction determines at 134 if arm encoder 40 indicates that the arm has begun to move. If the arm is determined to be moving at 134, then it is determined at 136 whether or not the boom has already begun to move. If it has not, then the control determines at 138 whether the velocity of the arm is approximately equal to the anticipated velocity resulting from the operator actuating the joystick. If so, then a future arm angle is calculated at 140 based upon present arm angle, system delay, and encoder velocity. If it is determined at 138 that the arm velocity is not approximately equal to anticipated velocity, then the future arm angle is calculated based upon factors further including the anticipated arm velocity represented by the position and velocity of joystick actuation. If it is determined at 136 that the boom has begun to move, then the control adjusts at 144 the lag considered by the system from a static value to a dynamic value.

If it is determined at 134 that the arm is not moving, then the hydraulic lag system delay value is adjusted at 146 according to a static, not a dynamic, situation. It is then determined at 148 whether the boom is moving. If not, then the anticipated arm angle is calculated at 150 based upon information including the anticipated velocity of the arm resulting from actuation of the joystick. If it is determined at 148 that the boom is moving, then the hydraulic lag is adjusted slowly from a static to a dynamic value at 152. If it is determined at 132 that the operator is not moving the joystick, then the future arm angle is equated with the present arm angle at 154 and the routine is exited.

Figure 8:
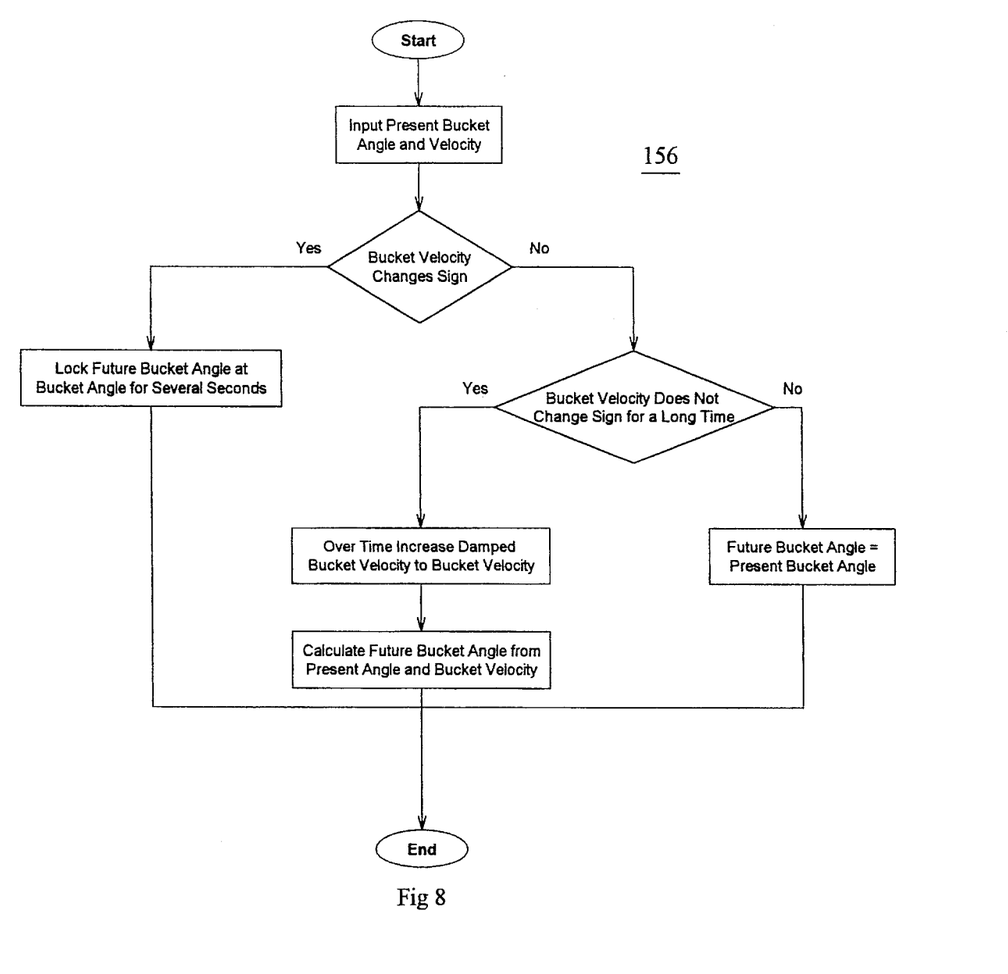
FIG. 8 is a flowchart of the "find future bucket angle" subfunction.

Returning to control loop 108 (FIG. 5), after the future arm angle is determined (122) the control then determines a future bucket angle at 156 as illustrated in FIG. 8. The find future bucket angle subfunction 156 includes a procedure for filtering out small, rapid oscillations in bucket movement, which is not uncommon. After the future arm angle and future bucket angle are determined (122, 156), boom error 96 is calculated (160) utilizing algorithm 72 as illustrated in FIG. 4. The control then calculates the integral and derivative of the boom angle error at 162 and finds the constants for the PID (Proportional Integral Derivative) controller at 164, as further illustrated in FIG. 9. The control then calculates a boom cylinder velocity at 166 and calculates an output for the valve driver (106) at 168. The valve output is then sent through a variable valve output delay routine at 170, as further illustrated in FIG. 10.

Figure 5:
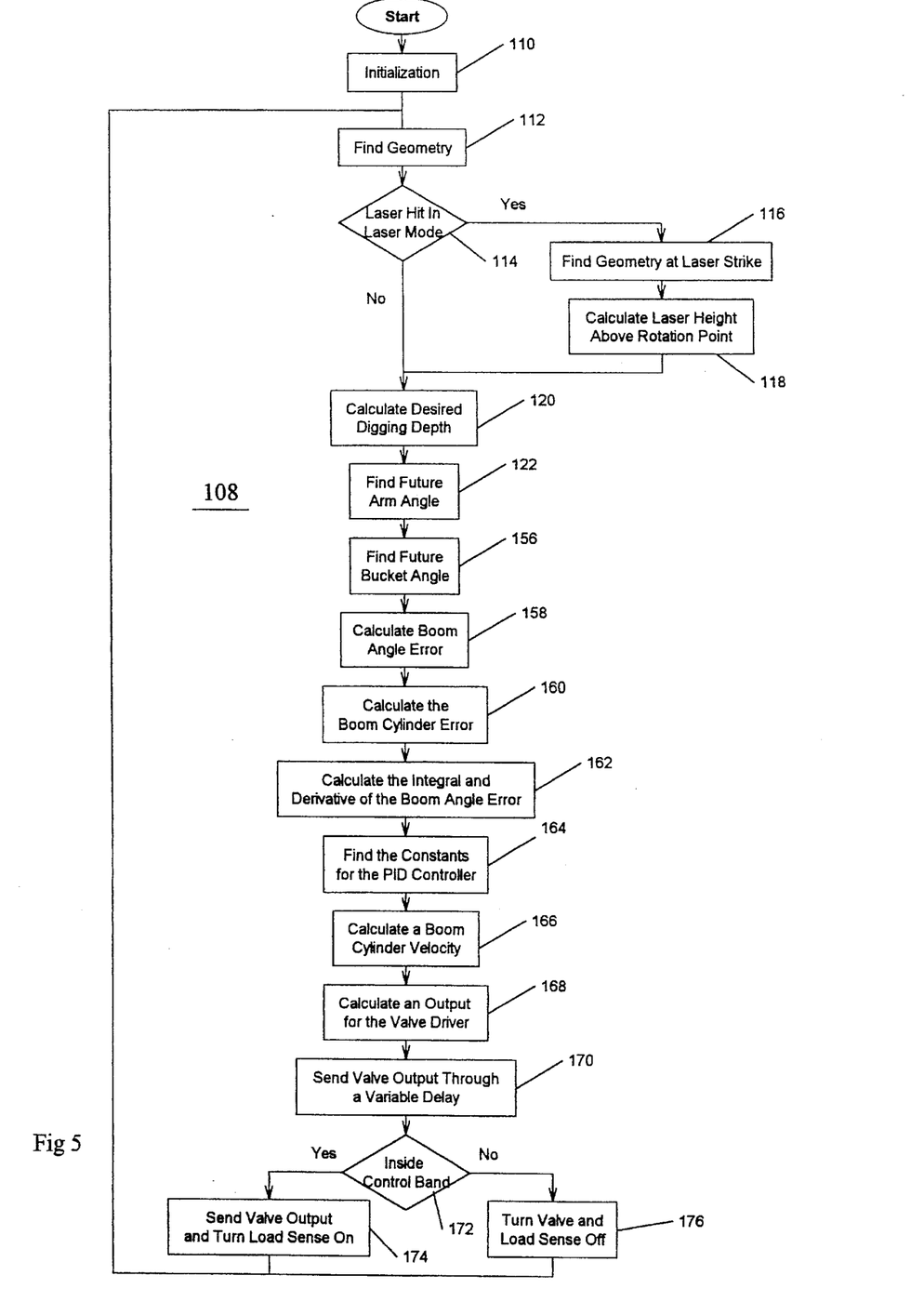
FIG. 5 is a flowchart of the primary control loop for providing commands to the hydraulic control valve.
Figure 6:
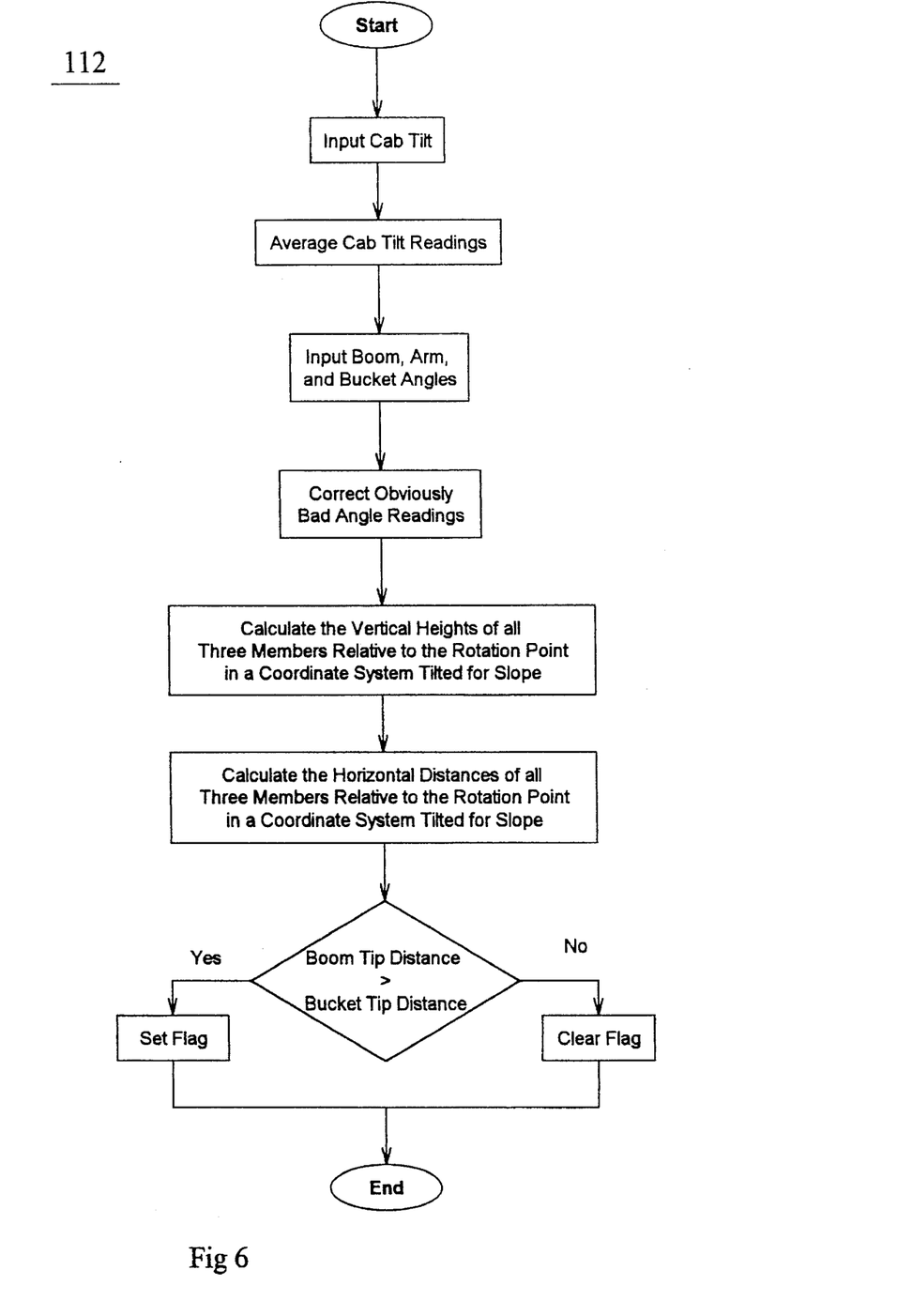
FIG. 6 is a flowchart of the "find geometry" subfunction.

The control then determines at 172 whether cutting edge 24 is within, or outside of, the control zone entered by the operator in control panel 54. If the cutting edge is inside of the control zone, then the valve output is sent at 174 to control valve 66. If cutting edge 24 is not inside the control zone, then the supply of valve 66 is turned off at 176.

Thus, it is seen that the present invention produces a control which anticipates movement of the tandem articulated members 22 which operate cutting edge 24 to a desired depth. It does so in a manner which anticipates the physical constraints of the system, including system delays. In this manner, the operator is capable of operating the large mass of excavator 20 in an effortless fashion while excavating to a desired depth and slope under the control of control system 32. In a preferred embodiment, the velocity of members 22 is limited to a maximum predetermined velocity. Additionally, in order to improve the response time of the control system, the primary hydraulic system is operated at maximum pump output pressure. This may be accomplished by various techniques including connecting the control port of the pressure regulating valve with the hydraulic reservoir. This causes the system to operate at a consistently high pressure, which increases response time. Controls embodying the present invention have been installed on hydraulic excavators of at least two different designs. Both excavators excavated satisfactorily without significant overshoot or oscillations when tested according to actual operation conditions.

Other embodiments of the invention will suggest themselves to the skilled artisan. For example, a delay could be inserted between the operator moving the control lever and actuation of the arm. This would result in equal delays in control of the arm and boom. Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of controlling a hydraulically operated construction machine, having a plurality of tandem articulated members, in a manner which moves said members in a predetermined pattern, wherein movement of a first one of said members is controlled in response to movement of a second one of said members, including:

determining anticipated future movement of said second member; and controlling said first member at least in part with an electronic control as a function at least of said anticipated future movement of said second member wherein said second member is manually controlled by a hydraulic valve which is responsible to an operator control lever and wherein said determining anticipated

9 future movement of said second member includes monitoring actuation of said control lever in order to provide an input to said electronic control.

2. The method of claim 1 wherein said monitoring actuation of said control lever includes determining a magnitude of actuation of said control lever.

3. The method of claim 1 wherein said controlling includes initiating movement of said first member in response to actuation of said control lever.

4. A method of controlling a hydraulically operated construction machine, having a plurality of tandem articulated members, in a manner which moves said members in a predetermined pattern, wherein movement of a first one of said members is controlled in response to movement of a second one of said members, including:

determining anticipated future movement of said second member; and controlling said first member as a function at least of said anticipated future movement of said second member;

wherein said anticipated future movement of said second member is a function at least of present position and velocity of said second member and system delay in movement of said second member.

5. A method of controlling a hydraulically operated construction machine, having a plurality of tandem articulated members, in a manner which moves said members in a predetermined pattern, wherein movement of a first one of said members is controlled in response to movement of a second one of said members, including:

determining anticipated future movement of said second member, wherein said second member is controlled by an operator control lever and wherein said determining anticipated future movement of said second member includes monitoring actuation of said control lever; and controlling said first member as a function at least of said anticipated future movement of said second member;

wherein said controlling includes initiating movement of said second member after a predetermined delay in response to actuation of said control lever.

6. A method of controlling a hydraulically operated construction machine, having a plurality of tandem articulated members, in a manner which moves said members in a predetermined pattern, wherein movement of a first one of said members is controlled in response to movement of a second one of said members, including:

determining anticipated future movement of said second member; and controlling said first member as a function at least of said anticipated future movement of said second member and as a function of the present position and the derivative and integral of said position of said present first member.

7. A method of controlling a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an operator lever for operating the hydraulic cylinder of one of said boom and arm, the hydraulic cylinder of the other of said boom and arm being automatically controlled in response to movement of said one of said boom and arm, including:

determining anticipated future movement of said one of said boom and arm; and controlling said hydraulic cylinder of said other of said boom and arm at least in part with an electronic control as a function at least of said anticipated future movement, wherein the operator lever is coupled with a manual hydraulic control valve that manually operates the hydraulic cylinder of said one of said boom and arm and wherein said determining anticipated future movement of said one of said boom and arm includes monitoring actuation of said control lever in order to provide an input to said electronic control.

8. The method of claim 7 wherein said monitoring actuation of said control lever includes determining a magnitude of actuation of said control lever.

9. The method of claim 7 further including determining anticipated future movement of said bucket and wherein said controlling is further a function of said anticipated future movement of said bucket.

10. The method of claim 7 further including calibrating said bucket cutting edge by locating said cutting edge at a reference datum and determining a position of said cutting edge during said locating.

11. The method of claim 7 further including calibrating said bucket cutting edge by receiving a rotating laser plane and determining a position of said cutting edge during said receiving.

12. The method of claim 11 wherein said receiving includes providing a laser receiver on one of said boom and arm.

13. The method of claim 7 including providing another operator lever for operating the hydraulic cylinder of the other of said boom and arm and inhibiting said controlling in response to significant actuation of said another operator lever.

14. A method of controlling a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an operator lever for operating the hydraulic cylinder of one of said boom and arm, the hydraulic cylinder of the other of said boom and arm being automatically controlled in response to movement of said one of said boom and arm, including:

determining anticipated future movement of said one of said boom and arm; and controlling said hydraulic cylinder of said other of said boom and arm as a function at least of said anticipated future movement;

wherein said anticipated future movement of said one of said boom and arm is a function at least of the present position and velocity of said one of said boom and arm and system delay in movement of said one of said boom and arm.

15. A method of controlling a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an operator lever for operating the hydraulic cylinder of one of said boom and arm, the hydraulic cylinder of the other of said boom and arm being automatically controlled in response to movement of said one of said boom and arm, including:

determining anticipated future movement of said other of said boom and arm; and controlling said hydraulic cylinder of said other of said boom and arm as a function at least of said anticipated future movement and as a function of the present position and the integral and derivative of said position of said other of said boom and arm.

16. A method of controlling a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an operator lever for operating the hydraulic cylinder of one of said boom and arm, the hydraulic cylinder of the other of said boom and arm being automatically controlled in response to movement of said one of said boom and arm, including:

determining anticipated future movement of said one of said boom and arm;

controlling said hydraulic cylinder of said other of said boom and arm as a function at least of said anticipated future movement of said one of said boom and arm; and determining anticipated future movement of said bucket and wherein said controlling is further a function of said anticipated future movement of said bucket, wherein said anticipated future movement of said bucket is a function at least of the present position and velocity of said bucket and system delay in movement of said bucket.

17. The method of claim 16 wherein said controlling is further a function of at least one of a target height and slope.

18. A method of controlling a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an operator lever for operating the hydraulic cylinder of one of said boom and arm, the hydraulic cylinder of the other of said boom and arm being automatically controlled in response to movement of said one of said boom and arm, including:

determining anticipated future movement of said one of said boom and arm; and controlling said hydraulic cylinder of said other of said boom and arm as a function at least of said anticipated future movement;

wherein said controlling includes limiting movement of said cutting edge below a given velocity.

19. A method of controlling a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an operator lever for operating the hydraulic cylinder of said arm, the hydraulic cylinder of said boom being automatically controlled in response to movement of said arm, including:

receiving a user input selection of a desired cutting depth;

monitoring movement of said bucket, said arm, and said boom;

determining an anticipated boom target position for said boom as a function of the selected desired cutting depth and the position, velocity, and system delay of each of said bucket and said arm; and controlling said boom to move in the direction of said anticipated boom target position.

20. The method of claim 19 wherein said controlling includes comparing the position of said boom with said anticipated boom target position to determine a boom error and moving said boom as a function of the value of said boom error and the integral and derivative of said boom error.

21. The method of claim 19 wherein said determining said anticipated boom target position further includes monitoring said operator lever and determining said anticipated boom target position further as a function of actuation of said operator level.

22. The method of claim 21 wherein said determining includes determining said anticipated boom target position as a function of a magnitude of actuation of said operator level.

23. The method of claim 19 including providing another operator lever for operating said boom hydraulic cylinder and inhibiting said controlling in response to significant actuation of said boom operating lever.

24. The method of claim 19 further including calibrating said bucket cutting edge by receiving a rotating laser plane and determining a position of said cutting edge during said receiving.

25. The method of claim 24 wherein said receiving includes providing a laser receiver on one of said boom and said arm.

26. The method of claim 19 further including calibrating said bucket cutting edge by locating said cutting edge at a reference datum and determining a position of said cutting edge during said locating.

27. A hydraulically operated construction machine having a body, a plurality of tandem articulated members extending from said body, a hydraulic drive system for moving said members with respect to each other subject to a system delay, and a control for said hydraulic drive system which moves said members in a predetermined pattern, wherein movement of a first one of said members is controlled in response to movement of a second one of said members, comprising:

position encoders on said first and second members, said position encoders monitoring the positions of said first and second members; and a control computer that is programmed to respond to said encoders to determine an anticipated boom target position for said first member as a function of the position, velocity, and system delay of said second member, said computer further being programmed to compare the position of said first member to said anticipated target position in order to control movement of said first member.

28. The hydraulically operated construction machine in claim 27 wherein said computer controls movement of said first member as a function of the value of said comparison and the integral and derivative of said comparison.

29. The hydraulically operated construction machine in claim 27 further including an operator control lever for manually controlling movement of said second member in response to actuation of said control lever and a monitor for said control lever, said computer being programmed to respond to said monitor in order to determine said anticipated boom target position also as a function of actuation of the control lever.

30. The hydraulically operated construction machine in claim 29 wherein said monitor provides a variable indication of the magnitude of actuation of the control lever.

31. The hydraulically operated construction machine in claim 27 further including an operator panel for receiving a user input selection of a target position of said second member and wherein said computer is programmed to respond to said control panel in order to determine said anticipated boom target position for said first member also as a function of the selected target position.

32. A hydraulic excavator control for a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an arm operator lever for operating the hydraulic cylinder of said arm and a bucket operating lever for operating the hydraulic cylinder of the bucket, the hydraulic cylinder of said boom being automatically controlled in response to movement of said arm and bucket, comprising:

position encoders for monitoring the positions of said boom, arm, and bucket; and a control computer programmed to respond to said encoders in order to develop commands to operate said boom as a function of the position, velocity, and system delay of each of said arm and said bucket and the position of said boom.

33. The hydraulic excavator control in claim 32 wherein said computer is programmed to determine a boom error by comparing said boom position with an anticipated boom target position value and develops said commands as a function of the value of said boom error and the integral and derivative of said boom error.

34. The hydraulic excavator control in claim 32 further including a monitor for said control lever and wherein said computer is programmed to be responsive to said monitor in developing said commands to operate said boom.

35. A hydraulic excavator control for a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an arm operator lever for operating the hydraulic cylinder of said arm and a bucket operating lever for operating the hydraulic cylinder of the bucket, the hydraulic cylinder of said boom being automatically controlled in response to movement of said arm and bucket, comprising:

position encoders for monitoring the positions of said boom, arm, and bucket;

a manual hydraulic valve directly coupled with said lever in order to manually operate the hydraulic cylinder of the arm;

a control lever monitor for actuation of said arm control lever; and a control computer programmed to be responsive to said encoders and said monitor in order to develop commands to operate said boom as a function of the position of said arm and bucket and actuation of said arm control lever.

36. A hydraulic excavator control for a hydraulic excavator having a boom pivotally connected at a proximate end with a cab, an arm pivotally connected at a proximate end with a distal end of said boom, a bucket pivotally connected at a proximate end with a distal end of said arm, a distal end of said bucket defining a cutting edge, a boom hydraulic cylinder for pivotally moving said boom with respect to said cab, an arm hydraulic cylinder for pivotally moving said arm with respect to said boom, a bucket hydraulic cylinder for pivotally moving said bucket with respect to said arm, and a hydraulic control system for operating said hydraulic cylinders, said hydraulic control system including an arm operator lever for operating the hydraulic cylinder of said arm and a bucket operating lever for operating the hydraulic cylinder of the bucket, the hydraulic cylinder of said boom being automatically controlled in response to movement of said arm and bucket, comprising:

position encoders for monitoring the positions of said boom, arm, and bucket;

a control lever monitor for actuation of said arm control lever; and a control computer programmed to be responsive to said encoders and said monitor in order to develop commands to operate said boom as a function of the position of said arm and bucket and actuation of said arm control lever;

wherein said hydraulic control system includes a primary operating system including pilot-operated valves for supplying high pressure fluid to said cylinders and a pilot system including said arm operating lever for supplying low pressure fluid to said pilot-operated valves, and wherein said monitor is a hydraulic pressure sensor connectable with said pilot system at said control lever.

37. The hydraulic excavator control in claim 36 including an electrically controlled valve connected hydraulically in parallel with said pilot valve for said boom and wherein said commands to operate said boom are supplied to said electrically controlled valve.

* * * * *